United States Patent
Alamuri et al.

(10) Patent No.: US 9,600,678 B1
(45) Date of Patent: Mar. 21, 2017

(54) IMAGE-BASED COMPLETELY AUTOMATED PUBLIC TURING TEST TO TELL COMPUTERS AND HUMANS APART (CAPTCHA)

(71) Applicant: CA, Inc., New York, NY (US)

(72) Inventors: Naga Venkata Sunil Alamuri, Telangana (IN); Ravindra Rajaram, Hauppauge, NY (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/561,673

(22) Filed: Dec. 5, 2014

(51) Int. Cl.
  *G06F 7/04* (2006.01)
  *G06F 21/62* (2013.01)
  *G06F 21/36* (2013.01)

(52) U.S. Cl.
  CPC .............. *G06F 21/62* (2013.01); *G06F 21/36* (2013.01)

(58) Field of Classification Search
  CPC ......... G06F 17/30247; G06F 17/30253; G06F 2221/2103; G06F 2221/2133
  USPC ........................................................ 726/30
  See application file for complete search history.

(56) References Cited

U.S. PATENT DOCUMENTS

| | | | | |
|---|---|---|---|---|
| 8,918,849 B2* | 12/2014 | Talamo | ................. | H04L 9/3273 726/6 |
| 2009/0313694 A1* | 12/2009 | Mates | ..................... | G06F 21/36 726/21 |
| 2009/0328150 A1* | 12/2009 | Gross | ...................... | A63F 13/12 726/3 |
| 2010/0229223 A1* | 9/2010 | Shepard | .................. | G06F 21/31 726/5 |
| 2012/0210393 A1* | 8/2012 | Yamahara | ............... | G06F 21/31 726/2 |
| 2012/0266215 A1* | 10/2012 | Frank | .................... | H04L 9/3271 726/3 |
| 2012/0272302 A1* | 10/2012 | Zhu | ......................... | G06F 21/36 726/6 |
| 2012/0323700 A1* | 12/2012 | Aleksandrovich | ..... | G06Q 30/00 705/14.69 |
| 2013/0014214 A1* | 1/2013 | Garside | .................. | G06F 21/36 726/2 |

(Continued)

OTHER PUBLICATIONS

Longe et al, Checking Internet Masquerading Using Multiple CAPTCHA Challenge-Response Systems, 2009, IEEE, pp. 244-249.*

(Continued)

*Primary Examiner* — Christopher Brown
*Assistant Examiner* — Jenise Jackson
(74) *Attorney, Agent, or Firm* — Coats & Bennett, PLLC

(57) ABSTRACT

An image is selected responsive to receiving an access request for access to protected content. An access code is assigned to the image, and the image is partitioned into a plurality of image tiles. Each image tile comprises a code segment, which is a part of the access code. The image tiles are then scrambled into a scrambled version of the image and displayed to a user. The user rearranges the scrambled version of the image to reassemble the image, identifies a correct sequence for the code segments, and then enters the code segments in the correct sequence as a codeword. The codeword is matched against the assigned access code. If they match, the user is granted access to the protected content. Otherwise the person is denied access to the protected content.

12 Claims, 6 Drawing Sheets

(56) References Cited

U.S. PATENT DOCUMENTS

| | | | | |
|---|---|---|---|---|
| 2013/0160095 | A1* | 6/2013 | Seleznyov | G06F 21/00 726/5 |
| 2014/0250514 | A1* | 9/2014 | Blomquist | G06F 21/36 726/7 |
| 2015/0195269 | A1* | 7/2015 | Slusar | H04L 63/308 726/4 |
| 2016/0246999 | A1* | 8/2016 | Pielot | G06F 21/84 |

OTHER PUBLICATIONS

Kamoshida et al, Word Salad CAPTCHA-Application and Evaluation of Synthesized Sentences, 2012, IEEE, pp. 799-804.*

* cited by examiner

ENTER THE CHARACTERS SHOWN IN THE IMAGE WITHOUT SPACES

IMAGE-BASED COMPLETELY AUTOMATED PUBLIC TURING TEST TO TELL COMPUTERS AND HUMANS APART (CAPTCHA)

BACKGROUND

The present disclosure relates to computer systems, and more particularly to a method for determining whether an entity attempting to access protected content on a computing device is a human.

A Completely Automated Public Turing test to tell Computers and Humans Apart (i.e., "CAPTCHA") is a challenge-response test utilized by an application program executing on a computer. The purpose of the CAPTCHA is to determine whether an attempt to access protected content, such as a web page, for example, is being made by a human or a "bot" (i.e., a software application that runs automated, repetitive tasks over the Internet).

Historically, conventional CAPTCHAs provide a distorted or warped image containing random alphanumeric text for display to a user, along with instructions to enter the displayed alphanumeric text into a text input box. If a user correctly enters the alphanumeric text on the display, the computer providing the CAPTCHA can safely assume that the user is a human. The idea is based on the assumption that humans are able to visually discern the letters and/or numbers that comprise a distorted image, while an automated "bot" is not.

BRIEF SUMMARY

The present disclosure provides a method and apparatus for configuring a computing device, such as a client device or an application server, for example, to determine whether a received request for access to protected content was ultimately generated by a human user or by a non-human user, such as an automated "bot," for example.

More particularly, in one embodiment, the present disclosure provides a computer-implemented method in which a computing device receives an access request for access to protected content from a user device. In response, the image, which is associated with an access code, is partitioned into a plurality of image tiles. The plurality of image tiles are then scrambled into a scrambled version of the image, and a challenge that comprises the scrambled version of the image is sent for display to the user. A challenge-response comprising a codeword is then received, and based on a comparison of the codeword to the access code associated with the image, access to the requested content is controlled.

In another embodiment, the present disclosure provides a device, such as a client device or an application server, comprising a communications interface configured to send data to and receive data from other devices, and a processor circuit. The processor circuit is operatively connected to the communications interface and configured to receive an access request for access to protected content. The processor circuit is also configured to partition an image associated with an access code into a plurality of image tiles, and then scramble the plurality of image tiles into a scrambled version of the image. The processor circuit then sends a challenge comprising the scrambled version of the image, and in response, receives a challenge-response comprising a codeword. Based on a comparison of the codeword and the access code associated with the image, the processor circuit is configured to control access to the protected content.

In another embodiment, the present disclosure provides a computer-readable storage medium configured to store program instructions thereon. When executed by a processor circuit of a user device, the program instructions configure the processor circuit to receive an access request for access to protected content, partition an image associated with an access code into a plurality of image tiles, and then scramble the plurality of image tiles into a scrambled version of the image. program instructions also configure the processor circuit to send a challenge comprising the scrambled version of the image, and receive a challenge-response comprising a codeword. Based on a comparison of the codeword and the access code associated with the image, the program instructions configure the processor circuit to control access to the protected content.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
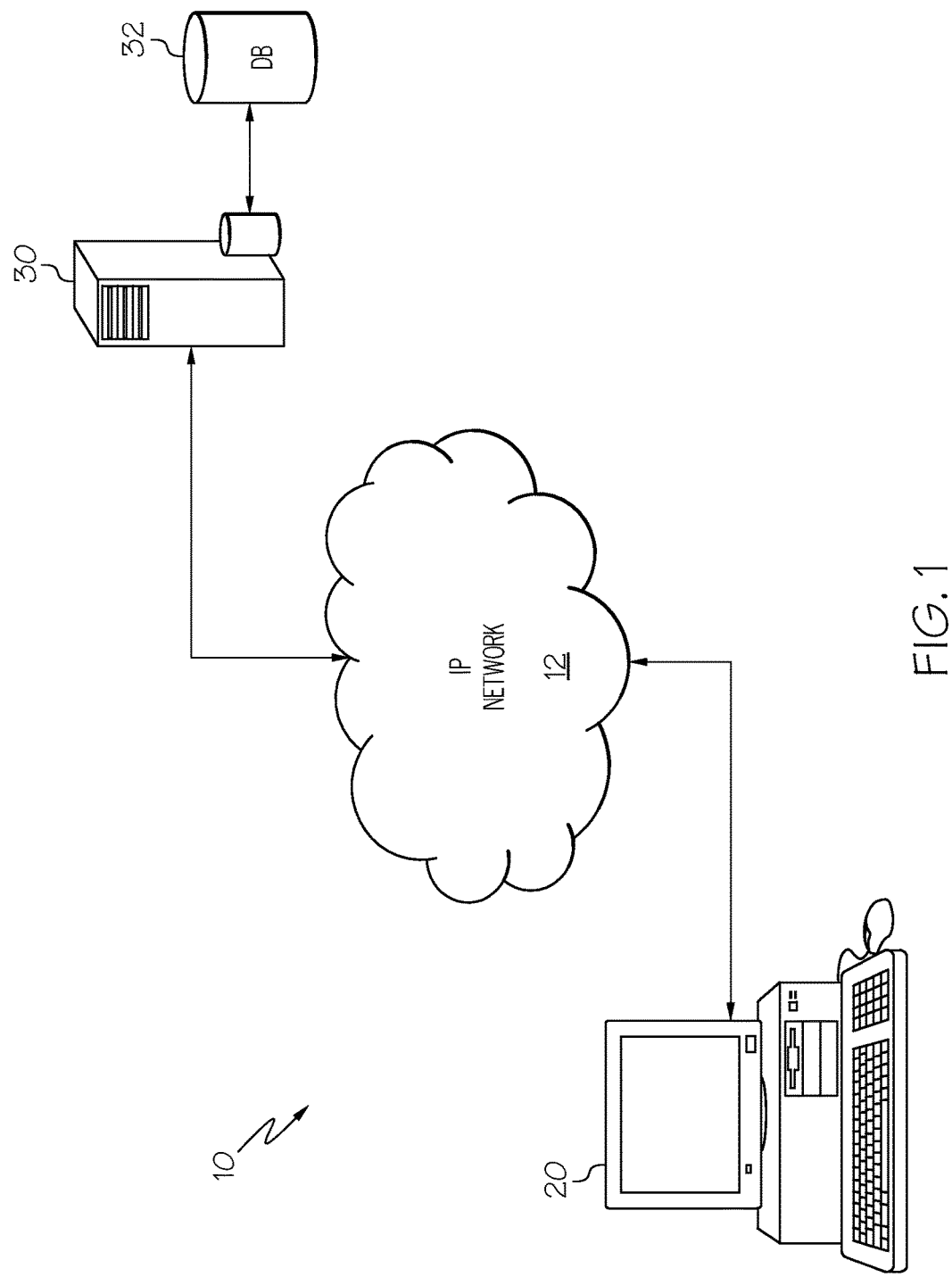
FIG. 1 is a block diagram illustrating components of a communications system according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Pen, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As stated above, CAPTCHAs are challenge-response mechanisms utilized by application programs to determine whether an entity attempting to access protected content, such as a web page, is a human user or an automated software application designed to perform repetitive, automated functions very quickly—i.e., a "bot." Because CAPTCHAs require human interaction, CAPTCHAs are particularly useful as a security mechanism to protect applications and/or data against such bots. Specifically, CAPTCHAs operate based on the assumption that human users are able to visually discern distorted random alphanumeric text on a display while automated bots cannot. That is, bots are generally unable to optically analyze a distorted image and discern the constituent text. Thus, CAPTCHAs help protect applications against brute force attacks or Denial of Service attacks that can be associated with bots.

Conventional CAPTCHAs, however, are becoming more susceptible to the latest image analysis techniques. Bots using such technology are now better able to analyze the distorted images and discern the random alphanumeric text comprising CAPTCHAs. This decreases the effectiveness of conventional CAPTCHAs at protecting against the types of attacks previously mentioned.

Accordingly, embodiments of the present disclosure provide a technique for protecting computing devices and systems from such brute force and Denial of Service attacks. Particularly, embodiments of the present disclosure provide a method and a corresponding computing device for generating CAPTCHAs that are not subject to the same types of image processing techniques currently threatening conventional CAPTCHA technology.

Turning now to the drawings, FIG. 1 is a block diagram illustrating some of the components of a communications system 10 configured according to one embodiment of the present disclosure. Those of ordinary skill in the art will readily appreciate that the components and system 10 seen in the figures is merely illustrative and not limiting. Other components not specifically seen here may also be included in system 10 as needed or desired.

As seen in FIG. 1, network 10 comprises an IP network 12, such as the Internet, for example, that communicatively interconnects a client device 20 and an application server (AS) 30. The AS 30, in turn, may be communicatively connected to one or more databases (DB) 32. In operation, a user at client device 20 may input data and/or commands, or control an application program executing on client device 20, to send signals and/or data to, and receive signals and/or data from, AS 30 in the form of commands and/or messages. For example, such data and/or commands may comprise a request for data to AS 30 to retrieve data from DB 32. Upon receiving the request from client device 20, the AS 30 may retrieve the data from DB 32 that corresponds to the request. The AS 30 may further format the retrieved data into a response message that is compatible with the application program executing on the client device 20, if desired, and then return the data in the response message to client device 20 via network 12 for consumption by the user and/or the application program executing on client device 20.

Figure 2:
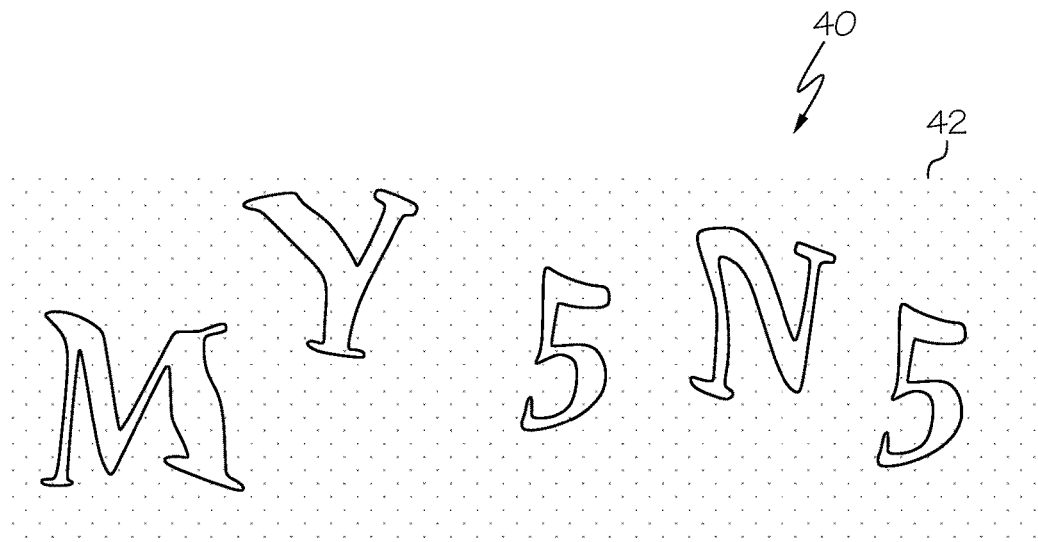
FIG. 2 illustrates a conventional implementation of a Completely Automated Public Turing test to tell Computers and Humans Apart (CAPTCHA).

Because the application programs executing on both the client device 20 and the AS 30 are susceptible to brute force or Denial of Service attacks by bots, one or both of these devices may utilize CAPTCHA technology to ensure that an entity attempting to access its content is actually a human user rather than an automated one. FIG. 2 illustrates a conventional implementation of such technology.

As seen in FIG. 2, an application program executing on either the client device 20 or the AS 30, for example, generates and displays a CAPTCHA 40 to a user responsive to detecting an access attempt. As is conventional, CAPTCHA 40 comprises one or more alpha-numeric strings 42, a user input section 44, and in some cases, instructions 46 that tell the user what action he or she should take regarding the CAPTCHA 40. The alpha-numeric string 42 comprises, in this case, a random sequence of letters and numbers (i.e., "MY5N5") overlaid on a colored and/or speckled background gradient. In some cases, the letters and numbers in the alphanumeric string 42 may be further distorted visually or obscured. As previously stated, these techniques help to prevent bots from optically analyzing the alphanumeric string 42 and discerning the characters utilizing advanced image analysis techniques.

However, a human user is still able to visually identify the letters and numbers in the alpha-numeric string 42 and input those characters into the input section 44. Once entered, the application program generating the CAPTCHA 40 can compare the characters input into the input section 44 to the alpha-numeric text in the CAPTCHA 40. If the characters entered into the text input section 44 are the same as the actual alpha-numeric characters of CAPTCHA 40, the application program that generated the CAPTCHA 40 can safely assume that the entity attempting access is a human user, and thus, and grant the requested access. If the characters entered into the text input section 44 do not match the alpha-numeric characters of CAPTCHA 40, the application program can safely assume that the entity attempting access is not a human being and deny the requested access.

Figure 3A:
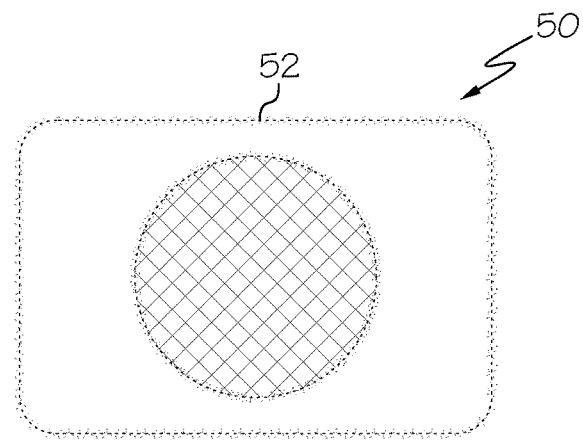
FIGS. 3A-3C illustrate a CAPTCHA implemented according to one embodiment of the present disclosure.
Figure 3B:
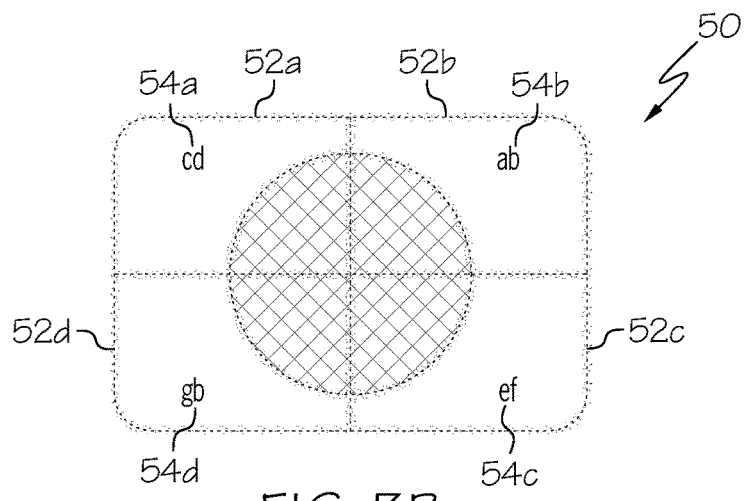
Figure 3C:
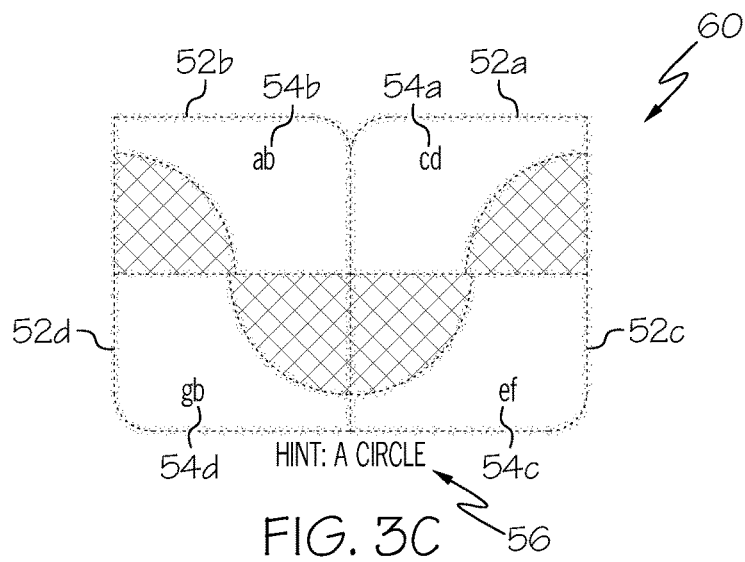

Because conventional CAPTCHAs 40 are becoming susceptible to the latest imaging techniques, however, the present disclosure provides an enhanced CAPTCHA to protect against such bots. FIGS. 3A-3C illustrate such an enhanced CAPTCHA implemented according to one embodiment of the present disclosure.

Particularly, in one embodiment, a plurality of images is stored in a repository at a server, such as DB 32 of AS 30. The images may be of a simple shape, or of a more complex object, such as an animal or face. For illustrative purposes only, the image used here is that of a circle (see FIG. 3A).

When a user attempts access to an application or some protected content, one of the images 52 (e.g., the circle of FIG. 3A) is retrieved from the repository and assigned a randomly generated access code that is stored in a memory. In the embodiment of FIG. 3, the access code is "cdabefgh." The image 52 is then partitioned into a plurality of "image tiles" 52a, 52b, 52c, 52d, and each image tile 52a, 52b, 52c, 52d is assigned a corresponding part of the randomly generated access. For example, as seen in FIG. 3B, the image tiles 52a, 52b, 52c, 52d in the image 52 are coded in a "clockwise" sequence, each with a corresponding part or segment of the access code. That is, the Top Left image tile 52a is assigned segment 54a (i.e., "cd"), while the Top Right, Bottom Right, and Bottom Left image tiles 52b, 52c, 52d are each assigned segments 54b (i.e., "ab"), 54c (i.e., "ef"), and 54d (i.e., "gh"), respectively. Using existing software, the partitioned image tiles 52a, 52b, 52c, and 52d are then shuffled or scrambled to generate a scrambled version 60 of image 52 (see FIG. 3C). Additionally, the borders between the scrambled image tiles 52a, 52b, 52c, and 52d, as well as that of the shape itself, may be distorted or obfuscated in the scrambled version 60 of image 52 to further hinder attempts by a bot at rearranging the image 52 using, for example, pixel matching techniques. This scrambled version 60 of the image 52 is then sent to a computing device for display to a user.

Upon receipt, the user will see the scrambled version 60 of image 52 on the display, such as in a browser, for example. In some embodiments, the user may also see a hint 56 that identifies the subject of the image 52. The hint will help a human user identify the subject of the image, and thus, assist a human user in reassembling the image tiles. According to embodiments of the present disclosure, program code, such as CSS code, for example, may also be provided along with the scrambled version 60 of image 52. Such program code is executable by the receiving computing device to allow the user to utilize a browser or other application program displaying the scrambled version 60 of the image 52 to rearrange the jumbled image tiles in the appropriate sequenced order.

By way of example only, the user may rearrange the jumbled image tiles 52a, 52b, 52c, 52d such that the resultant image displayed to the user is once again a circle. Once the user rearranges the image tiles 52a, 52b, 52c, 52d into the appropriate sequence, the codeword segments 54a, 54b, 54c, 54d are concatenated to once again form the codeword (i.e., cdabefgh) and validated. In one embodiment, for example, validating the codeword comprises comparing the codeword to the access code that was originally assigned to the image 52 and stored in a memory. If the rearranged codeword matches the access code stored in the memory, the user is likely a human being and is allowed to access the requested page or document, for example. Otherwise, if the comparison does not yield a match, the access is denied. In some embodiments, failed attempts can be redone, as needed or desired, using different images partitioned into different image tiles and having different codeword segments.

Figure 4:
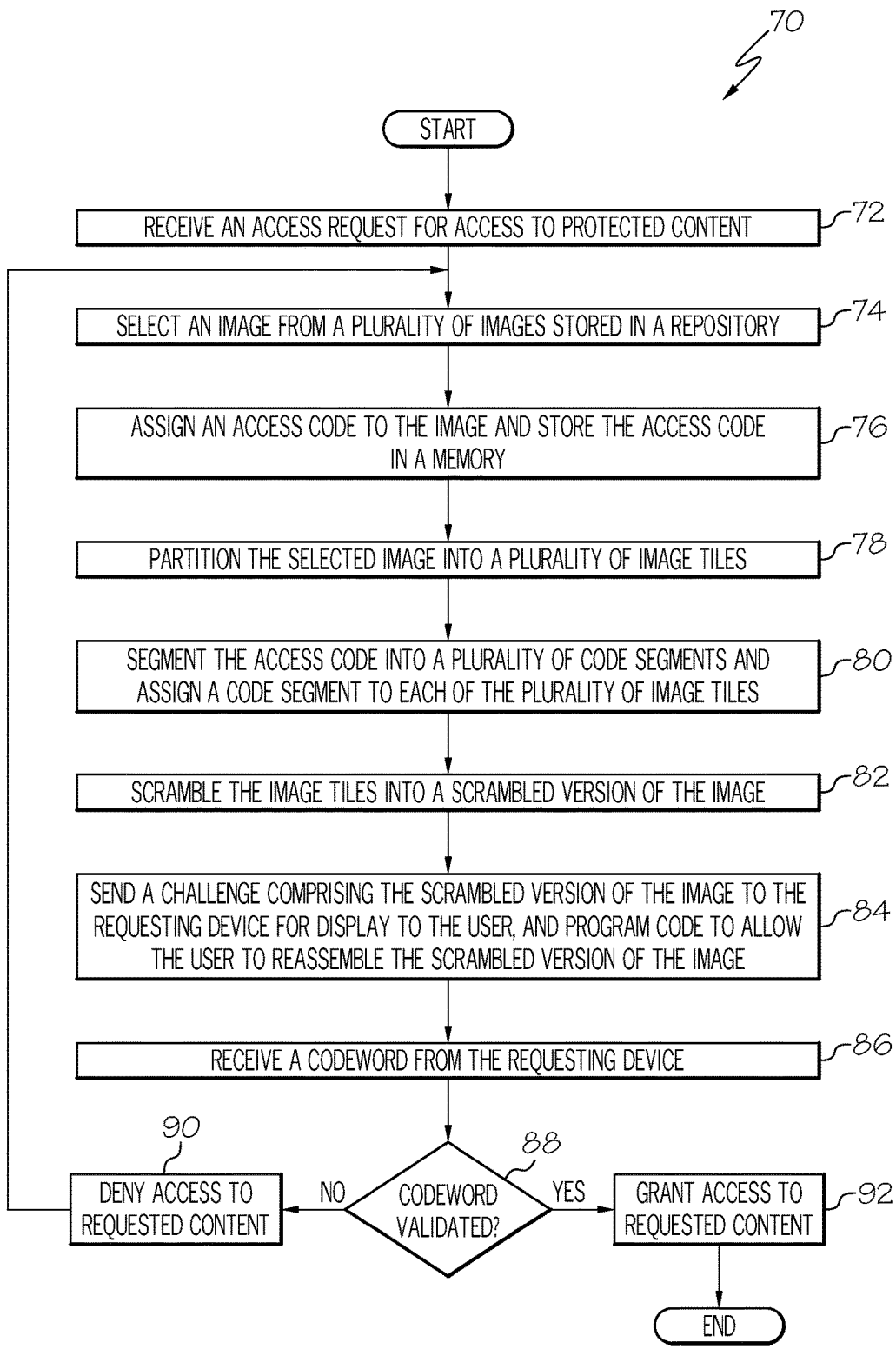
FIG. 4 is a flow diagram illustrating a method for implementing a CAPTCHA according to one embodiment of the present disclosure.

FIG. 4 is a flow diagram illustrating a method 70 for implementing a CAPTCHA according to one embodiment of the present disclosure. As described in FIG. 4, the AS 30 is the computing device that implements method 70. However, those of ordinary skill in the art should readily appreciate that this is merely for illustrative purposes. Method 70 may be implemented by client device 20 in addition to, or in lieu of, AS 30.

Method 70 begins with the AS 30 receiving a request message for access to protected content (box 72). By way of example only, a user may have requested access to a particular web page, or to restricted content, or to an application program executing on AS 30. Regardless of what content the user wishes to access, however, the AS 30 selects an image 52 from a plurality of different images stored in a repository, such as DB 32 (box 74).

The AS 30 also assigns an access code to the image 52, such as "cdabefgh" as previously described (box 76), stores the access code in memory, and partitions the selected image 52 into a plurality of image tiles 52a, 52b, 52c, 52d (box 78). AS 30 then segments the access code "cdabefgh" into a plurality of code segments 54a, 54b, 54c, 54d, respectively, and assigns a code segment 54a, 54b, 54c, 54d to each image tile 52a, 52b, 52c, 52d (box 80). The code segments 54a, 54b, 54c, 54d may be assigned in any order needed or desired, but in this embodiment, are assigned to the image tiles 52a, 52b, 52c, 52d in a clockwise manner beginning from the top left image tile 52a. The image tiles 52a, 52b, 52c, 52d along with the code segments 54a, 54b, 54c, 54d are then scrambled at AS 30 to generate the scrambled version 60 of the image 52 (box 82).

The AS 30 then sends the scrambled version 60 of the image 52 to the client device 20 in a challenge message (box 84). As previously stated, each image tile 52a, 52b, 52c, 52d in the scrambled version 60 of image 52 comprises a corresponding code segment 54a, 54b, 54c, 54d, which is displayed to the user along with the scrambled image tiles 52a, 52b, 52c, 52d. In addition, the AS 30 may also include program code with the challenge message for the client device 20. The program code, which may comprise CSS code, for example, will be executed by the client device 20. More specifically, the program code will configure the client device 20 to allow the user to rearrange the order of the image tiles 52a, 52b, 52c, 52d in the scrambled version 60 of the image 52 to allow a user to reassemble the original image 52 from the scrambled image tiles 52a, 52b, 52c, 52d. To help the user, the AS 30 may also provide a hint 46 in the challenge message that identifies directions for the user. For example, the hint 46 may identify the object in the image to the user. In this manner, a human user would know what the object in the image 52 is, and thus, be better able to rearrange the image tiles 52a, 52b, 52c, 52d in the proper sequence.

Once the user rearranges the image tiles 52a, 52b, 52c, 52d to their proper clockwise order, the AS 30 receives a codeword from the client device 20 in a response to the challenge message (box 86). The codeword may be manually entered by the user, or automatically sent by the application program that generated the CAPTCHA 40 upon detecting that the image tiles 52a, 52b, 52c, 52d are once again in their correct sequence, but correspond to the concatenated code segments 54a, 54b, 54c, 54d. Upon receipt of the codeword, the AS 30 will compare the codeword to the access code stored in memory (box 88). If the two do not match, the AS 30 will deny the requested access (box 90). In some embodiments, AS 30 may select a new image 52 from the repository (e.g., DB 32) and repeat method 70 to once again challenge the user (box 74-box 86). On the other hand, if the codeword matches the access code stored in the memory (box 88), the user at the client device 20 is likely a human user and is therefore granted access to the requested content (box 92).

The previous embodiments indicate the order in which the user rearranges the image tiles 52a, 52b, 52c, 52d is a "clockwise" order. However, any mention of a particular order is for illustrative purposes only. Those of ordinary skill in the art will readily appreciate that the present disclosure is not limited merely to a clockwise implementation for rearranging the scrambled tiles and that other non-clockwise orders for the image tiles are also possible.

By way of example only, another embodiment of the present disclosure may be configured to partition a given image 52 into a 3×3 matrix of image tiles. As above, each image tile in the 3×3 matrix is assigned a corresponding code segment. In such embodiments, when the user rearranges each image tiles in the scrambled version of the, the corresponding code segments are provided in row order beginning from the top left of the matrix:

(0,0), (0,1), (0,2),
(1,0), (1,1), (1,2),
(2,0), (2,1), (2,2))

In other embodiments, an image may be partitioned into a 5×4 matrix or 6×8 matrix. Further, the corresponding code segments for the image tiles may be provided in column order. Regardless of the partition and the associated order, however, embodiments of the present disclosure generate and present CAPTCHAs that are not subject to the same types of image processing techniques currently threatening conventional CAPTCHA technology.

Figure 5:
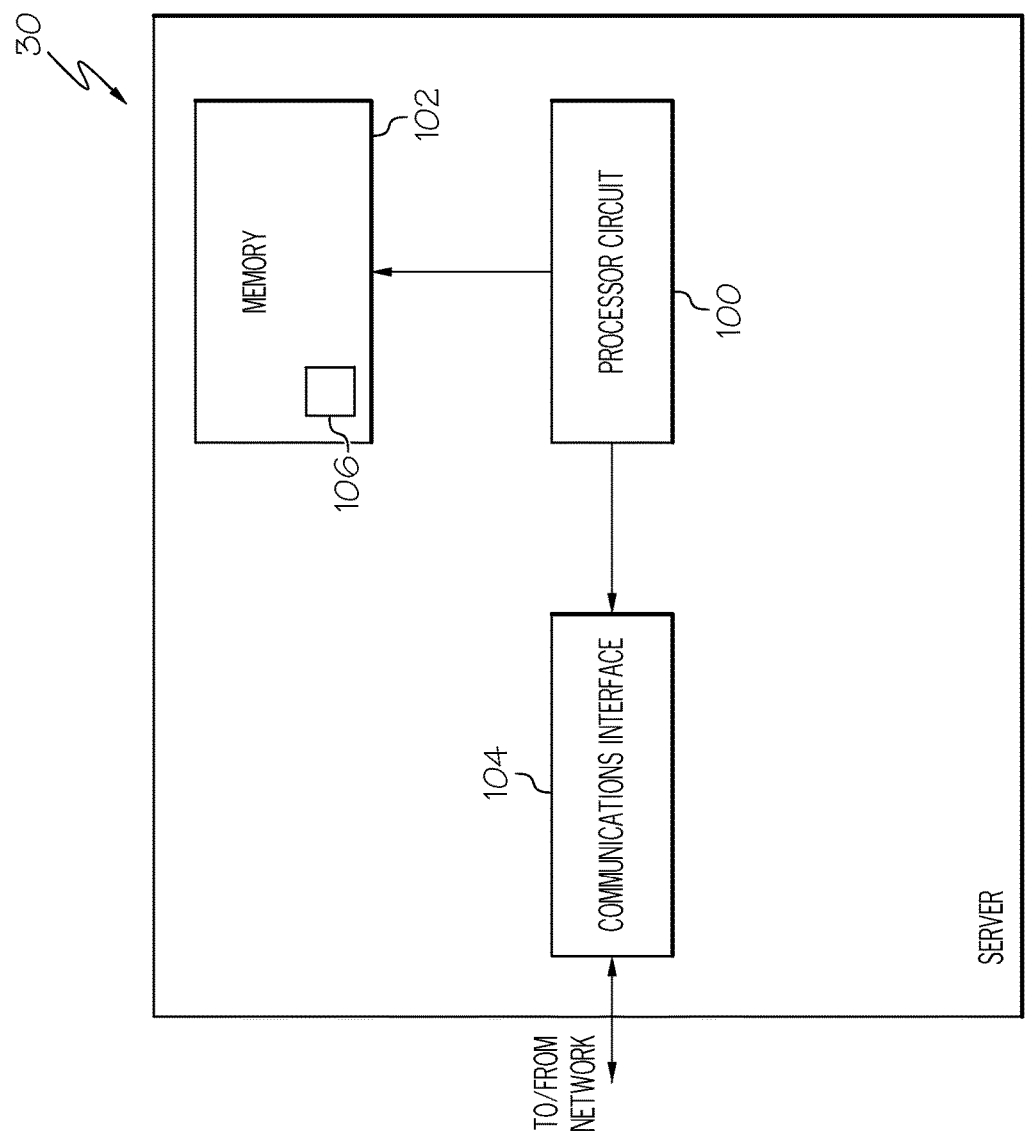
FIG. 5 is a block diagram illustrating some component parts of a network-based application server configured to implement a CAPTCHA according to one embodiment of the present disclosure.

FIG. 5 is a block diagram illustrating some functional component parts of a network-based application server, such as AS 30, configured to implement a CAPTCHA according to one embodiment of the present disclosure. As seen in FIG. 5, AS 30 comprises a processor circuit 100, a memory circuit 102, and a communications interface 104.

The processor circuit 100 may be implemented by one or more microprocessors, hardware, firmware, or a combination thereof, and generally controls the operation and functions of AS 30 according to logic and instructions stored in the memory circuit 102. Such operations and functions include, but are not limited to, generating and partitioning scrambled versions 60 of an image 52, sending the scrambled version 60 of the image 52 to client device 20 in a challenge message, receiving a codeword in a challenge-response message from the user of client device 20, and validating the user as a being a human as previously described. To accomplish these functions, the processor circuit 22 executes a control application 106 that may be stored in the memory circuit 102.

The memory circuit 102 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 102 stores the control application 106 that when executed by the processor circuit 100, controls AS 30 to perform the functions previously described.

The communications interface 104 may comprise any hardware circuit known in the art that enables AS 30 to communicate data and information with the client device 20 via IP network 12, as well as with the DB 32. By way of example only, the processor circuit 100 may send the challenge messages to the client device 20, and receive the challenge-response messages from the client device 20 as previously described. Additionally, in some embodiments, the processor circuit 100 may communicate with the DB 32 via the communications interface 104. To that end, the communications interface 104 in one embodiment comprises an interface card that operates according to any of standards that define the well-known Ethernet® protocol. However, other protocols and standards are also possible with the present disclosure.

Figure 6:
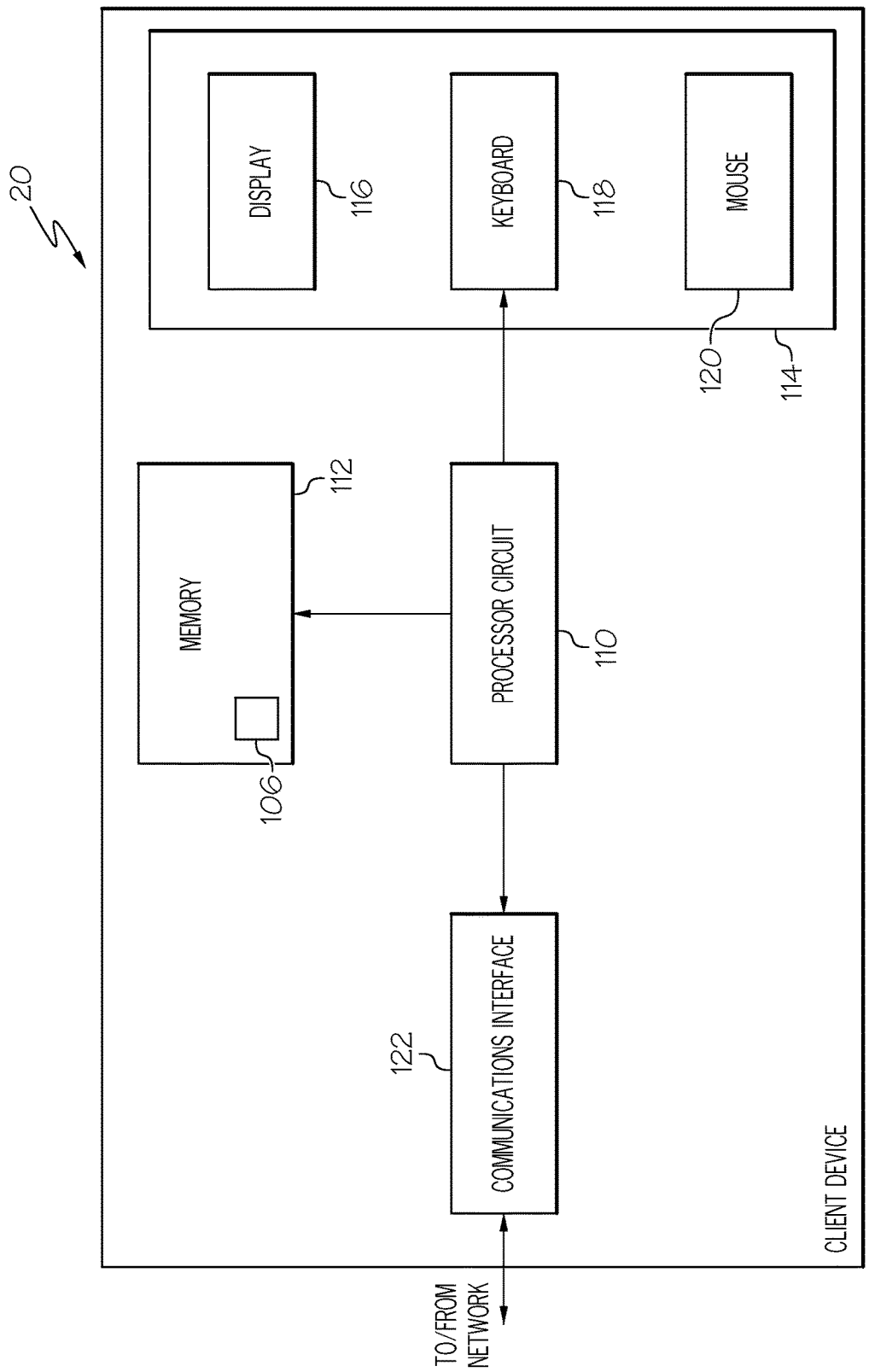
FIG. 6 is a block diagram illustrating some component parts of a client device configured to implement a CAPTCHA according to one embodiment of the present disclosure.

As previously stated, the network-based AS 30 is not the only computing device that may be configured to execute the method of the present disclosure. In another embodiment, the functions of the present disclosure are executed on client device 20. In such embodiments, the control application 106 that configures a processor circuit to perform the embodiments of the present disclosure is stored on the client device 20, or alternatively, is downloaded to the client device 20 from another application server, such as AS 30, for example. FIG. 6, therefore, is a block diagram illustrating some of the functional component parts of client device 20 configured to implement a CAPTCHA according to one embodiment of the present disclosure.

The client device 20 of FIG. 6 comprises a processor circuit 110, a memory circuit 112, a user I/O interface 114, and a communications interface 122. The processor circuit 110, like processor circuit 100 above, may be implemented by one or more microprocessors, hardware, firmware, or a combination thereof. The processor circuit 110 generally controls the operation and functions of client device 20 according to logic and instructions stored in the memory circuit 112. These operations and functions include communicating with AS 30 via network 12, as well as with other client terminals and devices.

In one embodiment, the processor circuit 110 executes the control application 106 to perform the above-described functions. Particularly, the control application 106 configures the processor circuit 110 to select an image 52 from a repository (e.g., memory circuit 112 and/or DB 32), partition the selected image into a plurality of image tiles, associate each of the image tiles with an access code, scramble the plurality of image tiles into a scrambled version of the image, and send a challenge comprising the scrambled version of the image to a display at the user device.

In this embodiment, the challenge comprises the CAPTCHA 50 displayed to the user. Therefore, in response, the user would input the concatenated code segments as a codeword into client device 20. Alternatively, the processing circuit 110, according to the instructions of control application 106, could automatically detect when the image tiles 52a, 52b, 52c, 52d have been rearranged into their proper order and send the concatenated codeword segments autonomously. Upon receiving the codeword, the processor circuit 110, under control of the control application 106, will either grant or deny access to the requested content, as previously described.

The memory circuit 112 may comprise any non-transitory, solid state memory or computer readable media known in the art. Suitable examples of such media include, but are not limited to, ROM, DRAM, Flash, or a device capable of reading computer-readable media, such as optical or magnetic media. As previously described, memory circuit 112 stores the control application 106 that when executed by the processor circuit 110, controls the client device 20 to perform the functions of the present disclosure according to one or more embodiments.

The User I/O interface 114 comprises any variety of known devices and circuitry configured to allow a user to interact with the client device 20. In FIG. 6, the user I/O interface 114 comprises a display device 116 to render information visually to a user, such as the scrambled version 60 of the image 52, and a keyboard 118 and mouse 120 to allow the user to interact with the client device 20. By way of example, the user may employ the mouse 120 and/or the keyboard 118 to rearrange the scrambled image tiles 52a, 52b, 52c, 52d to reassemble the original image 52. Once reassembled, the code segments 54a, 54b, 54c, 54d can be verified by processor circuit 110, as previously described.

The communications interface 122 may comprise any communication interface known in the art that enables the client device 20 to communicate data and information with other network-based and/or non-network terminals via IP network 12. For example, the communications interface 122 in one embodiment comprises an interface card that operates according to any of standards that define the well-known Ethernet® protocol. However, those of ordinary skill in the art will appreciate, however, that other protocols and standards are also possible with the present disclosure.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   assigning an access code to an image of an object, wherein the image is stored in a memory, and is different than the access code assigned to the image;
   receiving an access request for access to protected content from a user device; and responsive to receiving the access request:
  retrieving the image from the memory;
  partitioning the image into a plurality of image tiles;
  partitioning the access code assigned to the image into a plurality of access code segments;
  generating a scrambled version of the image comprising:
    assigning an access code segment to each of the plurality of image tiles according to a predetermined sequence; and
    scrambling the plurality of image tiles into the scrambled version of the image;
  sending a challenge to the user device for display to a user, the challenge comprising the scrambled version of the image such that the scrambled version of the image can be rearranged at the user device to obtain the access code;
  receiving a challenge-response comprising a codeword from the user device; and
  controlling access to the protected content based on a comparison of the codeword received in the challenge-response to the access code associated with the image, wherein controlling access to the protected content comprises:
    granting access to the protected content if the codeword received in the challenge-response matches the access code associated with the image; and
    denying access to the protected content if the codeword received in the challenge-response does not match the access code associated with the image.

2. The computer-implemented method of claim 1 further comprising selecting the image from a plurality of images stored in the memory.

3. The computer-implemented method of claim 1 wherein the challenge sent to the user device further comprises a hint that indicates a correct sequence for the access code segments.

4. The computer-implemented method of claim 1 wherein the challenge further comprises a hint that identifies the object in the image.

5. The computer-implemented method of claim 1 wherein sending a challenge comprising the scrambled version of the image to the user device further comprises sending program code to the user device, wherein the program code configures the user device to reassemble the scrambled version of the image responsive to user input.

6. A computing device comprising:
  a communications interface configured to send data to and receive data from other devices; and
  a processor circuit operatively connected to the communications interface and configured to:
    generate an access code;
    assign the access code to an image of an object, wherein the image is stored in a memory, and is different than the access code assigned to the image;
    receive an access request from a user device for access to protected content; and
    responsive to receiving the access request:
      retrieve the image from the memory;
      partition the image into a plurality of image tiles;
      partition the access code assigned to the image into a plurality of access code segments;
      generate a scrambled version of the image comprising:
        assigning an access code segment to each of the plurality of image tiles according to a predetermined sequence; and
        scrambling the plurality of image tiles into the scrambled version of the image;
      send a challenge to the user device for display to a user, the challenge comprising the scrambled version of the image such that the scrambled version of the image can be rearranged at the user device to obtain the access code;
      receive a challenge-response comprising a codeword from the user device; and
      control access to the protected content based on a comparison of the codeword received in the challenge-response to the access code associated with the image, wherein to control access to the protected content, the processor circuit is configured to:
        grant access to the protected content if the codeword received in the challenge-response matches the access code associated with the image; and
        deny access to the protected content if the codeword received in the challenge-response does not match the access code associated with the image.

7. The computing device of claim 6 further comprising a memory circuit configured to store the plurality of images, and wherein the processor circuit is further configured to select the image from the plurality of images stored in the memory circuit.

8. The computing device of claim 6 wherein the challenge further comprises a hint that indicates the predetermined sequence for the access code segments.

9. The computing device of claim 6 wherein the challenge further comprises a hint that identifies the object in the image.

10. The computing device of claim 6 wherein the processor circuit is further configured to send program code to the user device, wherein the program code configures the user device to reassemble the scrambled version of the image responsive to user input.

11. A non-transitory computer-readable storage medium configured to store program instructions thereon that, when executed by a processor circuit of a user device, configure the processor circuit to:
  generate an access code;
  assign the access code to an image of an object, wherein the image is stored in a memory, and is different than the access code assigned to the image;
  receive an access request for access to protected content from a user device; and
  responsive to receiving the access request:
    retrieve the image from the memory;
    partition the image into a plurality of image tiles;
    partition the access code assigned to the image into a plurality of access code segments;
    generate a scrambled version of the image comprising:
      assigning an access code segment to each of the plurality of image tiles according to a predetermined sequence;
      scrambling the plurality of image tiles into the scrambled version of the image; and
    send a challenge to the user device for display to a user, the challenge comprising the scrambled version of the image such that the scrambled version of the image can be rearranged at the user device to obtain the access code;
    receive a challenge-response comprising a codeword from the user device; and control access to the protected content based on a comparison of the codeword received in the challenge-response to the access code associated with the image, wherein to control access to the protected content, the program instructions configure the processor circuit to:
grant access to the protected content if the codeword received in the challenge-response matches the access code associated with the image; and
deny access to the protected content if the codeword received in the challenge-response does not match the access code associated with the image.

12. The computer-implemented method of claim 1 wherein each of the plurality of access code segments in the scrambled version of the image are human-readable while the scrambled version of the image is displayed to the user.

* * * * *